May 27, 1969

A. WRIEDT 3,446,365

VEHICLE COUPLING

Filed Oct. 26, 1966

INVENTOR
Alfred Wriedt
BY
Beaman & Beaman
attys

United States Patent Office 3,446,365
Patented May 27, 1969

3,446,365
VEHICLE COUPLING
Alfred Wriedt, Schulstrasse, Ulzburg, Holstein, Germany
Filed Oct. 26, 1966, Ser. No. 589,639
Claims priority, application Germany, Oct. 28, 1965,
W 40,188
Int. Cl. B61g *3/00*
U.S. Cl. 213—78                                                 8 Claims

ABSTRACT OF THE DISCLOSURE

A vehicle coupling arrangement for interconnected towed vehicles such as trailers, articulated truck conveyor systems, rail cars, and the like wherein the vehicles are normally interconnected by a pair of coupling members offset with respect to the longitudinal axis of the vehicles, and upon the vehicles traversing a curved path the interconnection between vehicles is limited to the coupling member radially disposed inwardly of the vehicle axis with respect to the curved path of movement in order to provide improved clearance characteristics between vehicles moving in a curved path.

---

With conventional vehicle couplings connected at the center line of the vehicle, movement about a curve causes the inside ends of connected cars to approach each other. In certain applications, this phenomenon is undesirable, for instance, in the case of a movable tramway consisting of truck-like individual members, on which parcels or other loads are conveyed. When driving on curved paths, in this arrangement, those parcels of the load disposed on the curve inner side will be pressed together.

In accordance with the invention, the disadvantage of conventional vehicle couplings as described above is avoided in that the vehicle ends facing each other each have supported therein for longitudinal displacement in the vehicle, two link rods arranged on both sides of the vehicle center line and spaced therefrom, said link rods being connected at the outer ends thereof, each in a respective joint, with the corresponding link rod of the other vehicle. Each link rod comprises a locking member at a predetermined point along the length thereof which, in a predetermined normal position of the link rod in the vehicle may enter into locking engagement, leaving some play in the longitudinal direction, with a lock fastened at the vehicle and associated with the respective link rod and provided with an unlocking arrangement. There are carried on at least one of the vehicles on both sides of the longitudinal center line and spaced therefrom, two switching devices actuable by the relative longitudinal movement of the two vehicles which is possible within the limits of the play, each of said switching devices being connected with the unlocking device of the lock disposed on the opposite side of the longitudinal center line of at least one of the vehicles in such a manner that with the vehicles being pushed together, on one side within the limits of the play, the lock disposed on the opposite side is unlocked.

Thus, in accordance with the invention, the pressure building up on the inside of the curve between the two vehicles is utilized to actuate the unlocking devices on the outside of the curve and release the link rods disposed thereby. As soon as the curve outer sides are unlocked, the entire load of the train will be transferred onto the link rods of the curve inner side; the compression pressure exerted on these link rods disappears, and the link rods on the inside of the curve are again stressed in tension so that the switching connections of the inside of the curve return to the position of rest and remove the unlocked condition of the locks of the outer curve. At this moment, however, the locking members of the link rods of the outside of the curve will already have been displaced from their predetermined normal positions with respect to the locks in such a degree that a renewed locking can no longer occur. Only after the curve drive has been completed will the end faces of the two vehicles facing each other be disposed again substantially in parallel with respect to each other, so that the link rods also of that side which previously had been the curve outer side return to their normal position relative to the locks which will then again be locked. The possible play between the locked link rod and the lock, in the case of the vehicle coupling in accordance with the invention, serves as a switching path for the switching device by which the respective oppositely disposed locks are unlocked. The unlocking may be effected mechanically, hydraulically, pneumatically or electrically.

In accordance with another feature of the invention, the switching devices may be connected with the unlocking devices of the locks disposed on the opposite side of the longitudinal center plane of both vehicles, so that upon actuation of the switching device the opposite locks of both vehicles are unlocked. In this manner the tensional stress is prevented from passing over from the curve outer side link rods to the curve inner side link rods when at first only one of the locks of the curve outer side has been unlocked.

The present invention may be utilized to advantage in particular in trains formed of several trucks, wherein the loading platforms of the trucks are designed as a roller track formed of rollers arranged transversely with respect to the direction of transport; in accordance with the invention, namely, it is then possible to arrange between the joints a bearing device for at least one intermediate roller. This intermediate roller prevents the parcels or other load disposed on the curve outer side from sliding into the gap forming therebetween two successive trucks when the train is driven on a curved path.

Also in accordance with the invention, it is possible with such trains formed of trucks, to utilize the portions of the link rods protruding from the vehicle each as a carrier for an additional bearing arrangement for at least one more intermediate roller. It is possible hereby in a still more efficient manner to prevent the formation of an undesired gap on the outside of the curve. Finally, it is possible when utilizing the invention in trains formed of trucks, to support handrail portions along the sides of the vehicles for longitudinal displacement in the vehicles which may be connected at the free outer ends thereof to the joint disposed on the same side of the longitudinal center plane. There will result in this manner an always continuous handrail uninterrupted even when the train moves on a curve, so that the dropping of parcels due to centrifugal forces occurring when the train moves on a curve, is safely avoided.

Further features and advantages of the invention will be seen from the following description of some examples of embodiments, which are illustrated in the drawings. In the drawings, FIGS. 1–1e diagrammatically illustrate the principle of the invention during sequential stages of operation, FIGS. 2–2b diagrammatically illustrate the mode of operation of an electric solenoid lock in accord with the invention, FIGS. 3–3c illustrate a mechanical lock in accord with the invention, FIGS. 4–4a diagrammatically show the arrangement of intermediate rollers and additional rollers between the individual vehicles of a train of trucks, also showing diagrammatically a displaceable handrail, FIGS. 5–5c diagrammatically illustrate another embodiment of the invention, FIGS. 6–6a diagrammatically illustrate a further embodiment of the invention.

Figure 1:
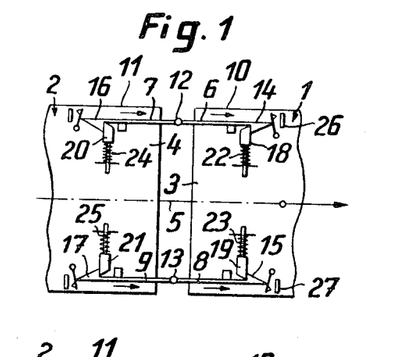
Figure 1A:
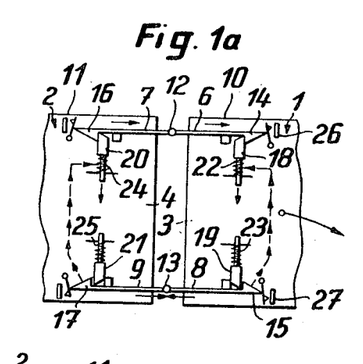
Figure 1B:
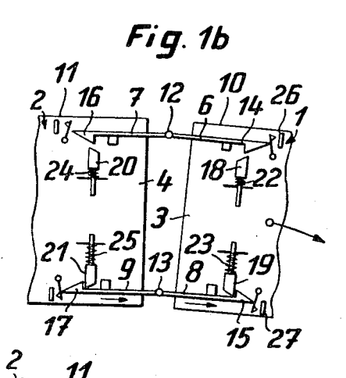
Figure 1C:
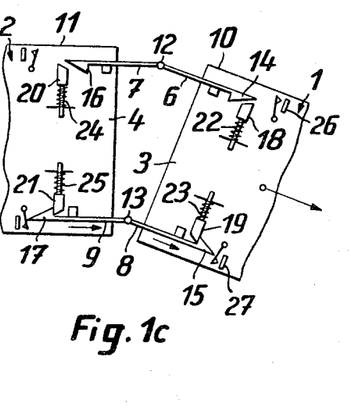
Figure 1D:
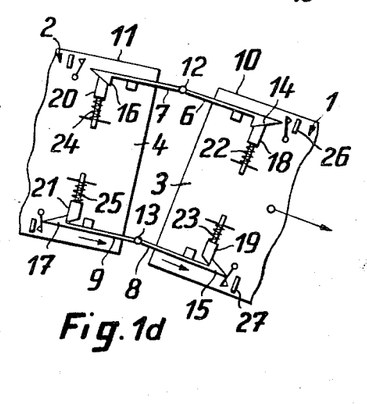
Figure 1E:
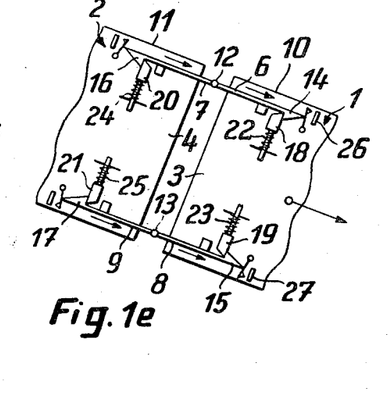

FIGS. 1–1e illustrate the operation of two vehicles 1 and 2 interconnected by means of a vehicle coupling in accordance with the invention when moving on a curved path, said vehicles 1 and 2 being shown in a diagrammatic top plan view. The two vehicles are each provided with two link rods 6, 8 and 7, 9 on both sides of the longitudinal center line 5 arranged for longitudinal displacement in the vehicles. Link rods 6, 7 and 8, 9, respectively, which are disposed on one and the same side of the longitudinal center line 5, are respectively interconnected by joints 12, 13 at their outer ends facing each other. The link rods are provided each with a locking member 14, 15, 16, 17 on a predetermined point along their length, said locking member being indicated here rather diagrammatically by two cams provided on the link rod. The locking members are in engagement with the locks shown rather diagrammatically at 18, 19, 20 and 21 as resilient locking pins. Each of the locks is provided with an unlocking device diagrammatically indicated here only by the reference numerals 22–25. In FIGS. 1–1e, it is assumed that in the simplest case the unlocking devices are electromagnetic coils which when energized pull the locking pin from out of the shoulder formed between the two cams of the link rods. As will be clearly seen from FIG. 1, the two vehicles 1 and 2 may be slightly approached to each other even in the locked condition, that means may be pushed together because the locks and the locking members are cooperating with play in the longitudinal direction.

Two switching devices 26 and 27 are provided on the vehicle 1 and also the vehicle 2 is provided with analogous switching devices. The switching devices are arranged in such a manner that they may be actuated by the relative longitudinal movement of the two vehicles which is possible within the limits of play. FIGS. 1–1e diagrammatically show these switching devices in the form of electric contacts. In the following, only the switching devices 26 and 27 of the one vehicle 1 will be described. Each of the two switching devices 26 and 27 is electrically connected with the respective oppositely disposed unlocking device 23 or 22, and to a voltage source in such a manner that, when the contact 26 is closed the unlocking device 23 is actuated and when the contact 27 is closed the unlocking device 22 is actuated. Thus, the respective contact always controls the unlocking device disposed on the opposite side of the same vehicle. This control connection is indicated by the dotted arrows in FIG. 1a.

In FIG. 1, the two vehicles are shown on a straight-on drive. During this driving operation, the two link rod connections 6, 7 and 8, 9 are stressed on tension, and the switching devices 26 and 27 consequently are open so that the unlocking devices are not becoming effective and the link rods are interlocked in the locks.

The curved tension arrow in FIG. 1a indicates that the vehicle is going to drive on a curved path on which the link rods shown in the lower position in FIG. 1a are pressed together as indicated by the double arrow shown at the bottom. The play of the locking members of the joint portions in the locks only need to be very small; in this respect the FIGS. 1–1e are not to be taken as a true scale. As will be seen from FIG. 1a, when the vehicles are going to move on a curved path, the tensional stress is transferred to the link rods on the outside of the curve shown in the upper position. The (upper) switching device 26, therefore, remains still ineffective. The (lower) switching device 27, however, is actuated due to the play the link rods have in the locks; this causes an actuation of the (upper) unlocking device 22. The (upper) unlocking device 24 on the vehicle 2 is operated in a corresponding manner. As will be seen from FIG. 1b, thus, the (upper) locks 18 and 20 are opened; the gap normally occurring on the outside of the curve when the vehicles move on a curved path is forming between the two vehicles 1 and 2; and the entire tensional load is transferred to the link rods 8 and 9 on the inside of the curve. In this connection it will be especially noted that the link rods 6–9 are capable of being displaced always only in the longitudinal direction in the vehicles 1 and 2, i.e. approximately in parallel with the sides 10 and 11 of the vehicles. The end portions 3 and 4 of the vehicles disposed opposite each other, of course, when the vehicles are moving on a curved path are no longer lying in parallel with respect to each other. As the tensional load is completely transferred to the link rods 8 and 9 on the inside of the curve, the compression pressure load on these tension rods disappears and, thanks to the play the interlocking portions of these pulling rods have in the locks 19 and 21, the pulling rods 8 and 9 protrude from the vehicles 1 and 2 in such an extent that the switching contact 27 and the corresponding contact of the vehicle 2 are again opened. Consequently, the energization of the unlocking devices 18 and 20 disappears, and the locks on the outside of the curve return to their closed position as may be seen from FIG. 1c. As, however, the link rods 6 and 7 on the outside of the curve have protruded from their vehicles 1 and 2 a considerable distance, the locking members 14 and 16 thereof are no longer in their normal position in which engagement with the locks 18 and 20 is possible. The link rods 6 and 7 thus still remain unlocked. Only when the vehicles gradually change over to straight-on drive as is shown in FIGS. 1b and 1e, will the locks 18 and 20 again snap into the locking members 14 and 16 of the outer joint rods 6 and 7 so that finally as will be seen from FIG. 1e, the original condition will be reestablished.

It is also possible to provide only one of the two vehicles, for instance the vehicle 1, with switching devices (switching devices 26 and 27). In this case, the unlocking devices 24 and 25 of the other vehicle 2 are likewise connected to these switching devices 27 and 26, respectively, so that the unlocking devices 22 and 24 or the unlocking devices 23 and 25 are respectively actuated in parallel. The same mode of operation results, of course, when both vehicles are provided with switching devices, however, use is made only of the switching device of one vehicle which then serves to control the unlocking devices of both vehicles respectively disposed on the other side of the longitudinal center line. In both cases it is secured at any rate by the parallel actuation of the unlocking devices respectively disposed on the outside of the curve that the link rods for the outside of the curve are unlocked on both vehicles.

The actuation of the switching devices by the ends of the link rods as shown in FIGS. 1–1e is not imperative; the switching devices may also be so fitted at the opposite end faces 3 and 4 of the vehicles 1 and 2 that they may be actuated in a different manner when the vehicles are pushed together in accordance with FIGS. 1a and 1b.

Figures 2, 2A, 2B:
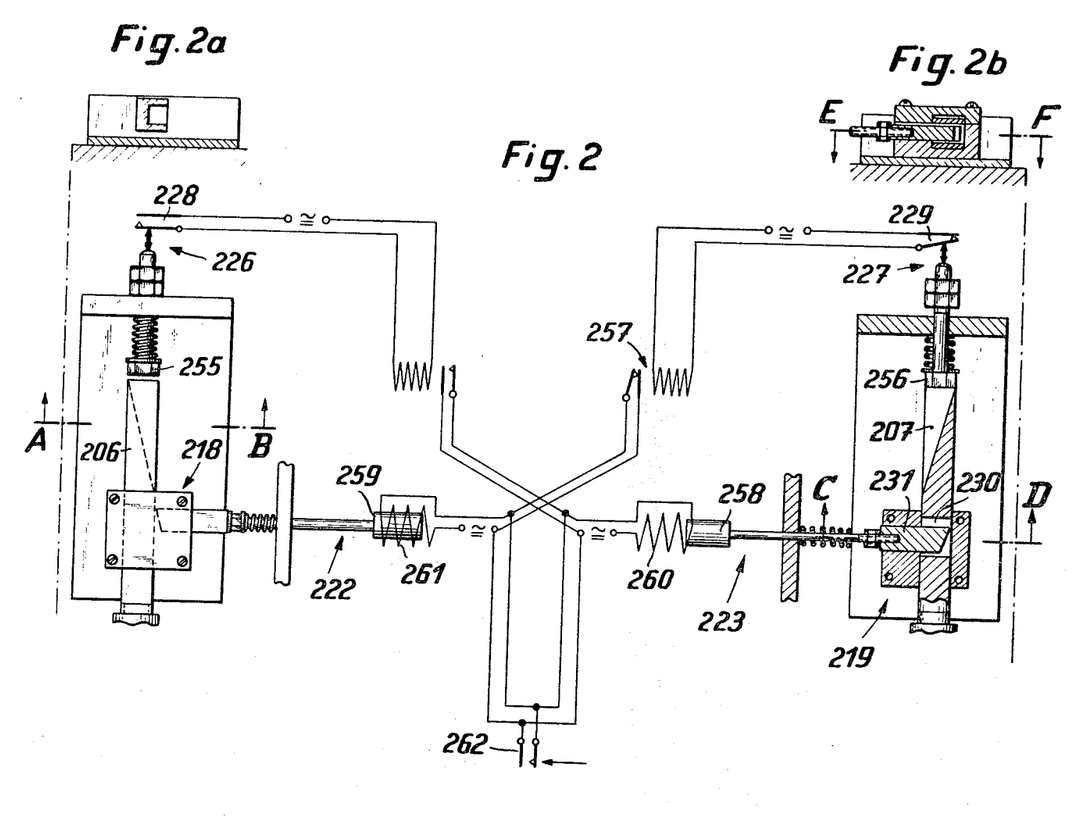

In FIGS. 2–2b, the design of the switching device and the unlocking device which have already been indicated in FIGS. 1–1e as being electric devices, is explained in more detail. The reference numerals which are used in these figures are always increased by 200 as compared with the corresponding reference numerals in the FIGS. 1–1e. Two link rods 206 and 207 are shown diagrammatically which are displaceably supported in locks 219 and 218 stationarily fitted at the vehicle. As will be seen from FIG. 2 here, the link rods are designed in the form of U-shaped profiles. As will be seen especially from the right-hand portion of FIG. 2 and from FIG. 2b, the profilated groove of the link rod may have a locking pin 231 of the lock sliding therein, said pin being supported for transverse displacement with respect to the direction of movement of the link rod in the locks 219 and 218, respectively. The locking pin is resiliently biased in the locking direction by a spring. In the right-hand portion of FIG. 2, and in FIG. 2b, the link rod 207 is shown in its normal position in which the locking pin 231 enters a recess 230 of the U-profile of the link rod 207 and thus locks the link rod 207. In addition, it may be seen from the right-hand portion of FIG. 2 that even in the locked condition the link rod 207 still has some play longitudinally in lock 219 because the width of the locking pin 231 is smaller than the width of the locking deepening 230.

In the case of the embodiment according to FIGS. 2–2b that end of the link rod 206 or 207, respectively, which is shown in the upper position, may come into engagement with a resiliently supported pressure button 255 or 256, respectively, is capable of actuating an electric switching contact 228 and 229, respectively, when in the fully contracted normal position in switching contact the locked link rod 207 is stressed on pressure within the limits of the play possible in the lock and is completely pressed into the vehicle. This condition which is shown in the right-hand half of FIG. 2, is effective to cause energization of a relay 257, the switching contact of which is thereby closed and completes an energizing circuit for the unlocking device 222 of the opposite link rod 206. This unlocking device 222 is here simply shown in the form of an iron core 259 which, with the unlocking device energized, is pulled into a coil 261 and thereby retracts the associated locking pin so that the link rod 206 may freely move in its lock 218. The unlocking device 223 on the other side of the same vehicle is deenergized because the link rod 206 shown to the left is not in contact with the pressure button 255; the iron core 258 there connected with the locking pin 231 is not pulled into the magnetic coil 260 corresponding to the coil 261. A manually operable pressure contact 262 is additionally provided, upon the actuation of which both unlocking devices 222 and 223 are energized and the link rods 207 and 206 are both unlocked.

Figures 3, 3A, 3B, 3C:
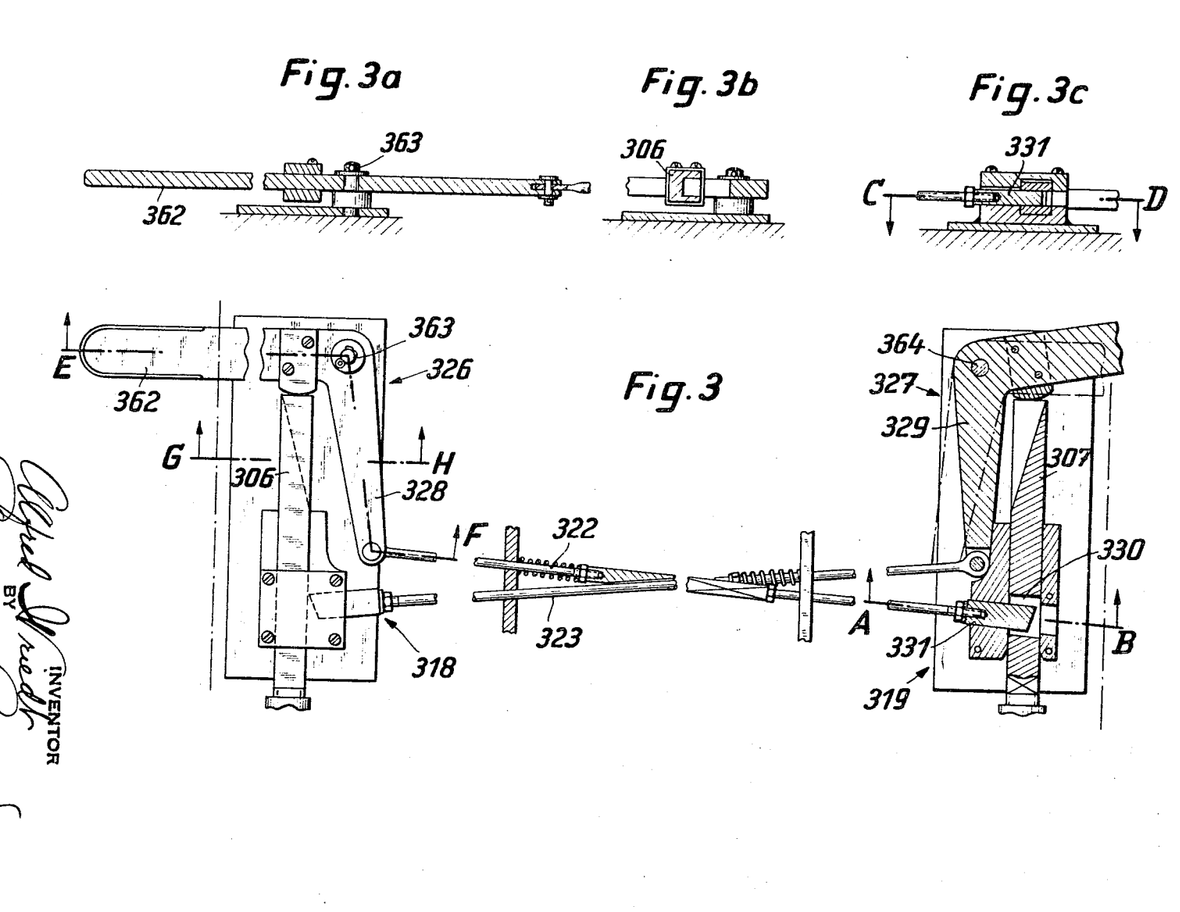

FIGS. 3–3b show diagrammatically a mechanical embodiment of the invention the function of which is analogous to that of FIG. 2. The reference numerals used are increased by 300 in comparison with the corresponding ones in FIGS. 1–1e. The two link rods 306 and 307 of a vehicle are again supported for displacement in the direction of the vehicle center line in their associated locks 318 and 319. The locks are again provided with locking pins 331 resiliently biased in the locking direction transversely of the link rods which may snap into recesses 330 in the same manner as in the case of the embodiments according to FIGS. 2–2b, said recesses being provided in the profilated grooves of the link rods formed as a U-shaped profile. Instead of the electric switching connections 226 and 227 of the embodiment in accordance with FIGS. 2–2b, however, mechanic switching devices 326 and 327 are provided in this embodiment each comprising essentially a bell crank 328 or 329 respectively, which may be pivoted about a bearing 363 or 364, respectively, by the free end of the associated link rod 306 or 307, in an easily understood manner. The unlocking device here essentially consists of mechanical connections 322 and 323 between the locking pins and the respectively oppositely disposed bell cranks 328 and 329. The mode of operation of the device may be easily seen from FIGS. 3–3c. For the decoupling to be effected manually, a handlever 362 is provided which is analogous to the manual pressure contact 262 in FIG. 2.

Figures 4, 4A:
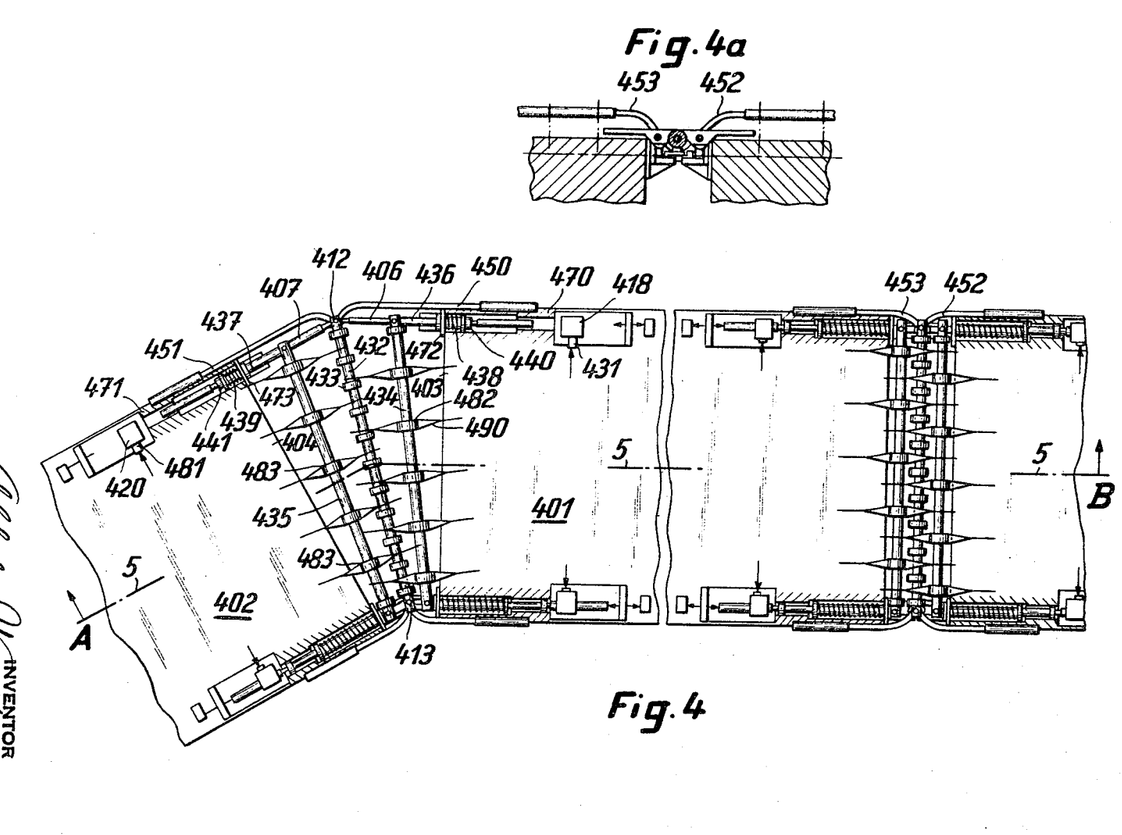

FIGS. 4, 4a and 5–5c show an embodiment of the invention which is especially suited for use in trains formed of trucks, wherein the loading platforms of the trucks are designed to form a roller track consisting of rollers arranged tranversely of the direction of transport. Such trucks have previously been disclosed and claimed in my United States Patent 3,306,477. The reference numerals used in FIGS. 4 and 4a are increased by 400 in comparison with the corresponding reference numerals used in FIGS. 1–1e. The left hand half of FIG. 4 shows in a diagrammatic top plan view, two coupled vehicles 401 and 402. The rollers which form the roller track, have been eliminated. In the following, only the relationships prevailing on the outside of the curve will be discussed in detail; the relationships prevailing on the inside of the curve (in connection with the link 413) may easily be derived therefrom without any special explanation. On those sides of the vehicles 401 and 402, which will be disposed on the outside of the curve, the link rods 406 and 407, respectively, for the outside of the curve are supported for longitudinal displacement each in a respective guide 470 or 471. The link rods 406 and 407 may enter the locks 418 and 420 by their ends adjacent the vehicle and may be locked there at a certain point along their length with the aid of locking pins 431 and 481 in the manner as described above. The design of the locks and the locking members of the link rods 406 and 407 is not shown in any more detail in FIGS. 4 and 4a and FIGS. 5–5c. It will be seen from FIG. 4 without any further explanation that a wide gap is forming on the outside of the curve between the opposite end portions 403 and 404 of the vehicles 401 and 402. In order to prevent the load, for instance, parcels, disposed on the loading platform of the vehicles from falling into this gap on the outside of the curve, additional rollers 433, 482 and 483 are provided in this embodiment. First, there is a bearing device 432 arranged between the two links 412 and 413, for the auxiliary rollers 433. The design of this bearing device may be seen in more detail from FIGS. 5–5c; the reference numerals shown there are always increased by 100 in comparison with those used in FIGS. 4 and 4a, but characterizing the same items when the other two digits are the same.

Figures 5, 5A, 5B, 5C:
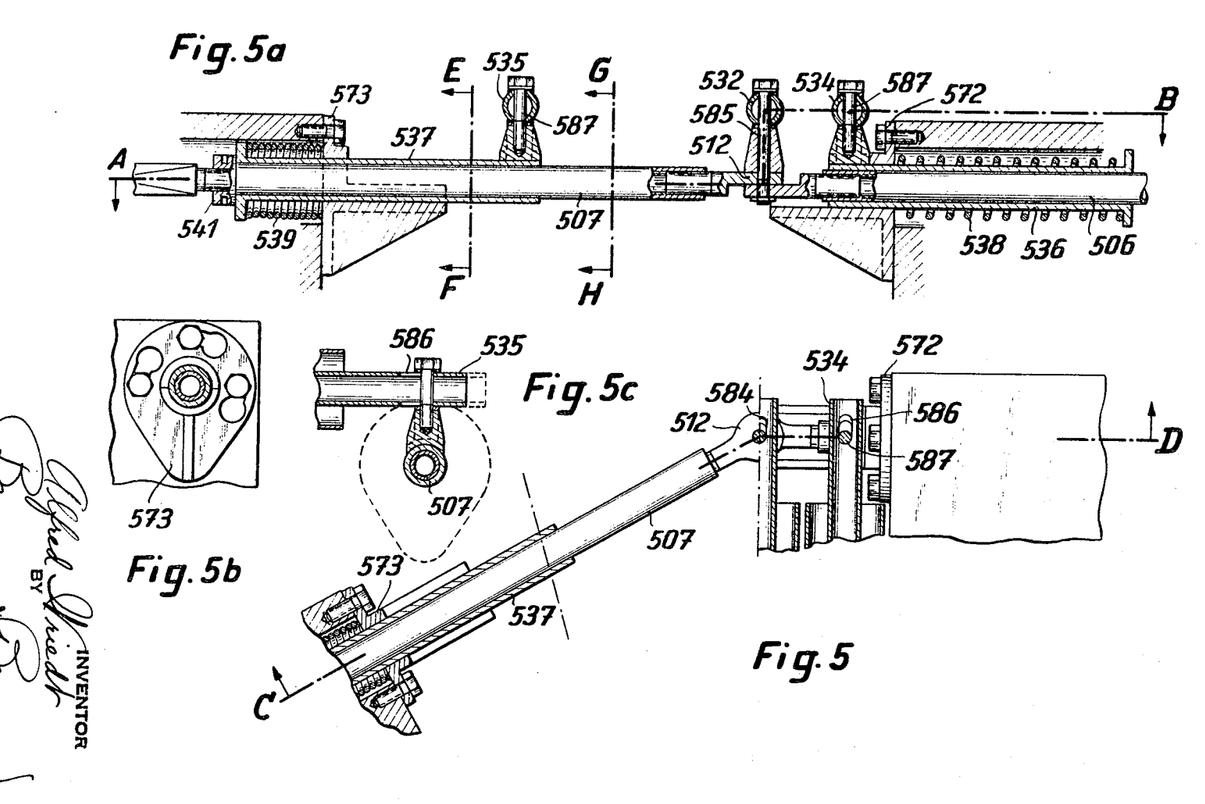

As the distance between the links 412 and 413 increases when the vehicles move on a curve, as will be clearly seen from FIG. 4 (FIG. 4 shows in the right-hand corner a coupling between the vehicle 401 and another vehicle still in a condition for straight-on drive), the bearing arrangement 432 is supported on both ends for longitudinal movement on the links. This will be clearly seen from FIGS. 5 and 5a; FIG. 5a essentially showing a top plan view and FIG. 5 a sectional view taken on line C:D of FIG. 5. It will be seen from these figures that the bearing arrangement for the intermediate rollers (not shown) extending between the links essentially consists of an axial pipe 502 which is provided with a longitudinal slot 484 at least at the one end thereof by which it is supported on the bearing pin 585 of the link 512 for displacement in the direction of its axis. Thereby the axial pipe 532 may adapt itself to the distance between the two links which is changed when the vehicle moves on a curved path. The support of the intermediate rollers on the axial pipe 532 is not shown any more in the figures.

In the case of the embodiments of the invention as shown in FIGS. 4, 4a and 5–5c the portions of the link rods protruding from the vehicle furthermore serve as carriers for additional bearing arrangements on which additional intermediate rollers 433 are arranged. In order to secure that these additional bearing arrangements always assume a position intermediate between the bearing arrangement between the two links already described and the respectively adjacent end portion of the vehicle, the additional bearing arrangements 485 and 486 are not directly supported on the link rods but on sleeves 436, 437 and 536, 537, respectively, which in turn are displaceably supported on the link rods. The sleeves are biased each by a spring 438, 439 and 538, 539, respectively, into a position in which they are retracted into the vehicle. A cam 440, 441 and 540, 541, respectively, is arranged on the link rod in a position such that after an outward movement of the link rod of a predetermined length the cam seizes the end of the respective sleeve adjacent the vehicle and, upon continued outward movement takes it along against the force of a spring. Therefore, when the vehicle moves on a curved path, at first only the link rod is extended on the outside of the curve and only from a certain position of the link rod will the sleeve be extended from the vehicle, said sleeve carrying the bearing arrangements for additional intermediate rollers. The additional bearing devices 434, 435 or 534, 535, thus will be pushed off from the associated end portion of the vehicle on the outside of the curve only if it is necessary to do so from a certain size of the gap that has been formed on. As, when the vehicle moves on a curve, owing to the oblique position of the bearing arrangements, the distance between the bearing points thereof on sleeves 436, 437 or 536, 537 likewise increases. The two bearing arrangements are also supported for limited displacement in the direction of their axes on the sleeves, same as is the case with the center bearing device 432 or 532. This may be recognized especially from FIGS. 5 and 5c. The bearing arrangement shown there again has the shape of an axial pipe 534 provided with an axially extending elongated bore 586 at the end thereof. A bearing pin 587 extends through this bore said bearing pin being fitted on a bearing trestle fastened to the sleeve 536 or 537. The bearing of the additional intermediate rollers on additional bearing arrangements 534 or 535 is not shown in the figures.

Figure 6:
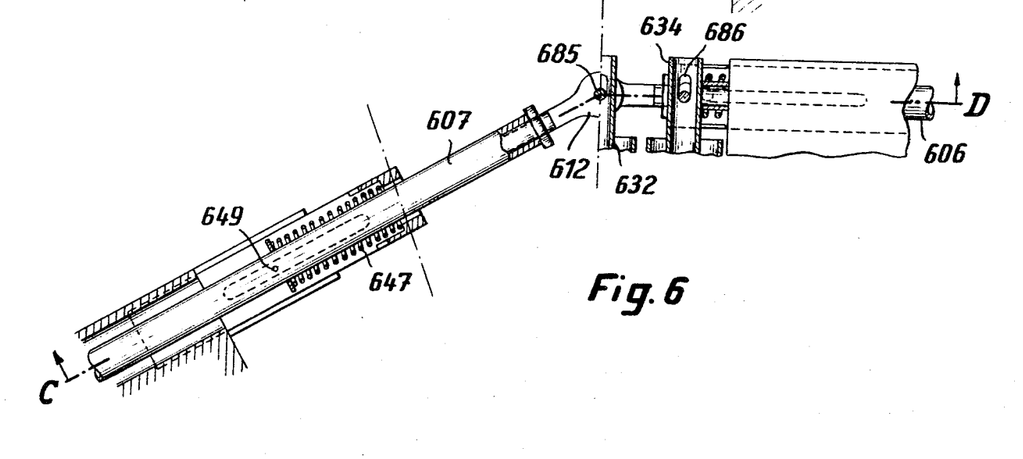
Figure 6A:
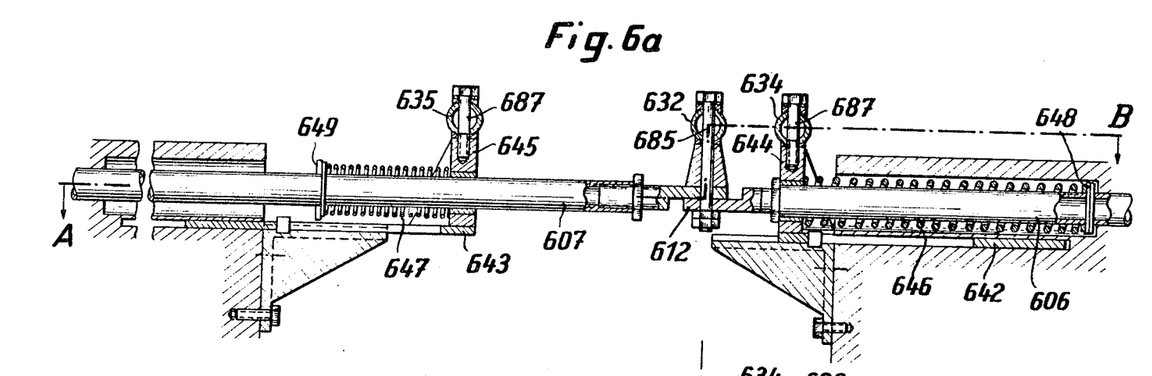

FIGS. 6 and 6a show another embodiment of the invention in which additional intermediate rollers are likewise arranged between two vehicles on a bearing arrangement disposed between the links and an additional bearing arrangement supported on the link rods. The manner of illustration in FIGS. 6 and 6a corresponds to that of FIGS. 5 and 5a. In the embodiment according to FIGS. 6 and 6a a carriage 642 or 643 is supported in the vehicle adjacent each link rod for displacement in parallel with the link rod 606 and 607. Each carriage supports a holder 644 and 645 for an additional bearing arrangement 634 and 635 extending between the two link rods of the vehicle for further intermediate rollers (not shown) corresponding to the additional intermediate rollers 482 and 483 of FIG. 4. The carriage 642 or 643 is coupled to the link rod 606 and 607, respectively, via a spring 646 or 647 effective in the direction of movement of the carriage. In this arrangement, the fastening point of the spring at the link rod is selected to be such that the spring is relaxed in a position between the fully extended position and the fully contracted position of the link rod and is extended in the fully retracted position of the link rod. FIG. 6a shows to the right thereof the normal position with the link rod in the fully retracted position and the spring 646 extended. In this normal position the carriage 642 thus is retracted into the body of the vehicle by the spring 646. If now, an outward movement of the link rod occurs on the outside of the curve, then the situation shown to the left in FIG. 6a will finally result. An abutment 648 or 649 is fastened on the link rod to which the one end of the spring 646 or 647 respectively is fastened. At first, during an outward movement of the link rod, the spring will only relax, the carriage then remaining in the absolutely retracted position as shown in FIG. 6a to the right thereof with the slide 642. In a certain intermediate position of the link rod which is now being extended, the spring will be just relaxed. If the link rod then still continues its outward movement from there on, the spring will be compressed by the abutment 649 and finally will push the carriage with it outwardly. This condition is shown in the left-hand portion of FIG. 6a. Thus, with the link rod 607 fully extended, one will obtain a position between the center bearing device and the adjacent vehicle also for the additional bearing arrangements 635, same as in FIG. 4 for the additional bearing arrangement 434 shown there. With the embodiments shown in FIGS. 6 and 6a the holder 644 or 645 for the additional bearing device 634 or 635 is displaceably supported on the link rod 606 and 607, and the spring 646 or 647 is a coil spring surrounding the link rod. But this is by no means necessary; of course, the holder for the additional bearing devices 634 and 635 may also be arranged laterally beside the link rod and also the spring between the link rod and the holder need not be a coil spring coaxial to the link rod.

Besides, FIGS. 6 and 6a are also intelligible with the aid of the explanations given in connection with FIGS. 5 and 5a. The reference numerals used in FIGS. 6 and 6a are always increased by 100 in comparison with those in FIGS. 5–5c.

The arrangement, in accordance with the invention, of link rods supported at the vehicle body, in the direction of the longitudinal center line which are connected by pairs in joints, makes possible the arrangement of a handrail on both sides of the vehicles in an especially simple manner which can be maintained uninterrupted even when the vehicles move on curved paths. Such a handrail is diagrammatically shown in FIGS. 4 and 4a. It will be seen that pieces of the handrail 450, 451, 452 and 453 are supported on the vehicles along the sides thereof for displacement in a longitudinal direction. These pieces of handrails are connected on their free outer ends with the link disposed on the same side of the longitudinal center line.

In FIG. 4, the relief gates 490 are diagrammatically shown which surround the additional intermediate rollers 482 leaving a slight axial space (not shown) and which are fastened on the additional bearing devices 434. The height of these relief gates is dimensioned to be such that the additional rollers 482 only slightly project above the upper edge of the relief gates. The portion shown to the extreme right of FIG. 4 shows the manner in which the release gates are sliding one into the other when the vehicle moves straight on. The relief gates form a grid-like platform between successive vehicles adapted to be pushed together. The use thereof is possible due to the additional bearing devices 434 provided in accordance with the invention. While the additional rollers 482 are, of course, rotatably supported on the additional bearing devices 434, the relief gates are rigidly connected with the additional bearing devices 434.

Other embodiments are possible without leaving the scope of the invention.

What I claim is:

1. A coupling arrangement for interconnecting two vehicles each having a longitudinal axis comprising, in combination, a pair of vehicles, a pair of rod members mounted upon each vehicle and extending therefrom in a direction substantially parallel to the vehicle's axis, a rod member being mounted on each side of said axis of each vehicle, bearing means axially slidable mounting each of said rod members upon its associated vehicle, journal elements pivotally interconnecting the rod members of said vehicles located on a common side of said vehicles' axes, locking devices mounted upon each of said vehicles selectively connected to said rod members to selectively restrain said rod members against axial displacement under tension forces, and control means sensing the occurrence of compression forces within said rod members, the control means of each rod member on a vehicle being connected to and selectively operating the locking device of the other rod member mounted on the same vehicle whereby the occurrence of compression forces in said rod members as said vehicles move in a non-linear path releases the locking devices on the rod members on the opposite side of the vehicle axis limiting the effective connection of vehicles traveling in a curved path to the rod members disposed radially inwardly of the vehicle axes with respect to the curved path of vehicle movement.

2. A coupling arrangement as claimed in claim 1 in which said control means include electrical switching elements and electrical servo elements responsive to said electrical switching elements for unlocking said locking devices.

3. A coupling arrangement as claimed in claim 1 in which said control means include mechanical switching elements and mechanical servo elements responsive to said mechanical switching elements for unlocking said locking devices.

4. A coupling arrangement as claimed in claim 1 in which said vehicles have charging surfaces substantially on the same horizontal level, a first longitudinally extending supporting element provided between said two journal elements, at least one idle motion between one of said two journal elements and said first longitudinally extending supporting element for enabling a longitudinal motion between said first longitudinally extending supporting element and at least one of said journal elements and at least one first rolling conveying member rotatably supported on said first longitudinally extending supporting element, the upper portion of said first rolling conveying member lying substantially in the plane of said charging surfaces.

5. In a coupling arrangement as claimed in claim 4, at least one second longitudinally extending supporting element arranged in a substantially horizontal plane between said first longitudinally extending supporting element and an end of one of said vehicles, at least two bracket members spaced one from another for mounting said second longitudinally extending supporting element on said last named vehicle, at least one idle motion between one of said bracket members and said second longitudinally extending supporting element for enabling a longitudinal motion between said second supporting element and said last named bracket member, and at least one second rolling conveying member rotatably supported on said second supporting element, the upper portion of said second rolling conveying member lying substantially in the plane of said charging surfaces and the upper portion of said first rolling conveying member.

6. A coupling arrangement as claimed in claim 5 comprising, in combination, guide members provided on at least one of said vehicles adjacent said bracket members for enabling said bracket members to move axially in a substantially parallel relationship with respect to said rod members of said vehicles, a resilient member between each of said bracket members and the associated vehicle urging each of said bracket members toward a first position adjacent the end of the vehicle, entrainment devices having first and second entrainment elements located between each of said rod members and each of said guide members, a lost motion device between each of said first and said second entrainment elements permitting said rod members to be displaced axially away from the end of the associated vehicle a limited distance before said first and said second entrainment elements engage one another and for moving said bracket members to a second position away from the end of the vehicle when said rod members are axially displaced away from the end of the vehicle against the action of said resilient members.

7. In a coupling device as claimed in claim 1 a railing member being provided on at least one longitudinal side of at least one of said vehicles near an end thereof, said railing member comprising a substantially horizontally extending handrail member and a rail post member angularly extending thereto, a guide element for longitudinally guiding said handrail member on the side of said vehicle, and a fastening element for fastening said rail post member to said journal element on said side of said vehicle.

8. In a coupling arrangement as claimed in claim 1, a manual shift member connected to at least one of said locking devices for manually unlocking the associated locking device.

References Cited
UNITED STATES PATENTS
| | | | |
|---|---|---|---|
| 478,778 | 7/1892 | Bellon | 213—97 |
| 1,257,904 | 2/1918 | Machoroski | 213—89 |

FOREIGN PATENTS
| | | |
|---|---|---|
| 698,190 | 11/1930 | France. |
| 958,619 | 2/1957 | Germany. |

DRAYTON E. HOFFMAN, *Primary Examiner.*

U.S. Cl. X.R.

213—90, 175